United States Patent
Cohen et al.

(10) Patent No.: US 8,924,550 B2
(45) Date of Patent: *Dec. 30, 2014

(54) MONITORING APPLICATION PROGRAM RESOURCE CONSUMPTION

(71) Applicant: Google Inc., Mountain View, CA (US)

(72) Inventors: Gabriel A. Cohen, Alameda, CA (US); Michael G. Morrissey, Atlanta, GA (US); Jeffrey A. Sharkey, Mountain View, CA (US); Ashish Sharma, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/718,032

(22) Filed: Dec. 18, 2012

(65) Prior Publication Data
US 2013/0111020 A1    May 2, 2013

Related U.S. Application Data

(63) Continuation of application No. 13/270,892, filed on Oct. 11, 2011, now Pat. No. 8,359,389.

(51) Int. Cl.
| | |
|---|---|
| *G06F 15/173* | (2006.01) |
| *H04W 4/20* | (2009.01) |
| *H04L 29/08* | (2006.01) |
| *H04W 24/00* | (2009.01) |
| *G06F 11/34* | (2006.01) |

(52) U.S. Cl.
CPC ......... *H04W 24/00* (2013.01); *G06F 2201/875* (2013.01); *H04W 4/20* (2013.01); *G06F 11/3409* (2013.01); *H04L 67/025* (2013.01); *G06F 11/3495* (2013.01)
USPC .......................................... 709/224; 709/219

(58) Field of Classification Search
CPC .......... G06F 2201/875; G06F 11/3409; G06F 11/3495; H04W 4/20; H04W 24/00; H04L 67/025
USPC ............... 709/224, 219; 455/187.1, 572, 419, 455/566; 345/211; 713/300
See application file for complete search history.

(56) References Cited

U.S. PATENT DOCUMENTS

| | | |
|---|---|---|
| 6,801,940 B1 | 10/2004 | Moran et al. |
| 7,609,650 B2 | 10/2009 | Roskowski et al. |

(Continued)

OTHER PUBLICATIONS

'PCWorld' [online]. "Smackdown:Amazon Appstore vs. Android Market," 2011, [retrieved on Dec. 16, 2011]. Retrieved from the Internet: <URL: http://www.pcworld.com/article/222870/smackdown_amazon_appstore_vs_android_market.html>. 3 pages.

(Continued)

*Primary Examiner* — Jungwon Chang
(74) *Attorney, Agent, or Firm* — Fish & Richardson P.C.

(57) ABSTRACT

In general, the subject matter described in this specification can be embodied in methods, systems, and program products for monitoring application program resource consumption. Information that identifies consumption, by multiple computing devices and at requests of a particular application program, of resources that correspond to the computing devices is accessed. Each of the multiple computing devices provided a portion of the information. The accessed information is analyzed by a computing system to determine one or more values that identify consumption of the resources by at least a subset of the computing devices. An indicium that illustrates the one or more values is provided for display on a particular computing device and in cooperation with a display of a network-accessible application program software marketplace. The application program software marketplace provides application program software for execution by the particular computing device and other computing devices.

19 Claims, 7 Drawing Sheets

(56) References Cited

U.S. PATENT DOCUMENTS

| | | | |
|---|---|---|---|
| 8,359,389 B1* | 1/2013 | Cohen et al. | 709/224 |
| 2001/0054026 A1 | 12/2001 | Choate | |
| 2002/0151293 A1 | 10/2002 | Tysor | |
| 2002/0178206 A1 | 11/2002 | Smith | |
| 2003/0009507 A1 | 1/2003 | Shum | |
| 2003/0084018 A1 | 5/2003 | Chintalapati et al. | |
| 2007/0016672 A1 | 1/2007 | Wilson et al. | |
| 2008/0057894 A1* | 3/2008 | Aleksic et al. | 455/187.1 |
| 2008/0126318 A1 | 5/2008 | Frankovitz | |
| 2008/0261662 A1* | 10/2008 | Ashbrook et al. | 455/572 |
| 2008/0268828 A1* | 10/2008 | Nagaraja | 455/419 |
| 2009/0005002 A1 | 1/2009 | Agarwal | |
| 2009/0150545 A1 | 6/2009 | Flores et al. | |
| 2009/0158189 A1 | 6/2009 | Itani | |
| 2009/0271514 A1 | 10/2009 | Thomas et al. | |
| 2010/0100512 A1 | 4/2010 | Brodin et al. | |
| 2010/0198879 A1 | 8/2010 | Flores et al. | |
| 2011/0040990 A1* | 2/2011 | Chan et al. | 713/300 |
| 2011/0067093 A1 | 3/2011 | Kamada et al. | |
| 2011/0072292 A1 | 3/2011 | Khawand et al. | |
| 2011/0109613 A1* | 5/2011 | Asai et al. | 345/211 |
| 2011/0219118 A1 | 9/2011 | Cowan et al. | |
| 2011/0276442 A1 | 11/2011 | Momtahan et al. | |
| 2012/0015695 A1* | 1/2012 | Hackborn et al. | 455/566 |

OTHER PUBLICATIONS

'The Washington Post' [online] "Google Launches Android Market," 2008, [retrieved on Dec. 16, 2011]. Retrieved from the Internet: <URL: http://www.washingtonpost.com/wp-dyn/content/article/2008/10/22/AR2008102201356_pf.html>. 3 pages.

International Search Report and Written Opinion in International Application No. PCT/US2012/059051, dated Jan. 31, 2013, 13 pages.

* cited by examiner

MONITORING APPLICATION PROGRAM RESOURCE CONSUMPTION

CLAIM OF PRIORITY

This application is a continuation of U.S. patent application Ser. No. 13/270,892, filed on Oct. 11, 2011, the entire contents of which are hereby incorporated by reference.

TECHNICAL FIELD

This document generally relates to monitoring application program resource consumption.

BACKGROUND

A computing system may include multiple application programs, and these application programs may execute upon startup of the computing system or upon the computing system receiving user input to launch the application programs. For example, a display of the computing system may present multiple icons that each corresponds to a respective application program. A user can select one of the icons (e.g., by clicking with a mouse or touching the icon with the user's finger) to launch the corresponding application program. An application program may be a computer program that a computing system can execute. For example, the application program may include instructions that are encoded in a computer-readable device and that one or more processors of the computing system can execute.

The application programs may come pre-loaded with the computing system when a user purchases the system or may be added to the computing system at the request of the user. An example technique for adding an application to the computing system includes inserting a compact disc that contains an installation file for the application program. The user may select the installation files in order to prompt the computing system to install the application program.

A user may also add application programs to the computing system through the use of a network-accessible application program software marketplace. In some examples, the application program software marketplace may be a web site that allows users to browse through a list of application programs that are able to be installed on the users' computing systems.

A user can elect to install or execute specific application programs that are presented by the application program software marketplace. In response, the application program software marketplace may provide one or more application program installation or executable files for receipt by the user's computing system. Upon the computing system receiving the installation files, the computing system may decompress information that is stored within the installation files and configure the computing system for operation of the application programs.

A computing system may use, at request of an application program, resources that correspond to that computing system. Such resources can include, for example, central processing unit (CPU) cycles, computing system energy or battery consumption, wireless network data usage, and text messages. A computing system's resources may be costly or limited. For example, a computing system's use of a wireless network may be metered, for example, by a wireless network service provider. A user of the computing system may be billed for use of the wireless network for each unit of bandwidth used, or for each unit of bandwidth used above a data cap. Similarly, a computing system may have a limited amount of battery power that is available before the computing system may require a recharge, and may have a limited level of processing that the computing system may expend over a given period of time.

SUMMARY

A system can inform computer users about the levels of various system resources that application programs and similar items may demand of a computing device on which they are installed. The system may be useful because application programs can consume different levels of computing system resources. For example, a first application program may consume more wireless network bandwidth or energy consumption than does a second application program during typical use. Such differences in consumption of computing system resources are meaningful to device users, as the devices often offer limited resources. Information that identifies an application program's historical or anticipated consumption of computing system resources may be valued by users that are considering using the application program. For example, consumption of resources by other users in the past can help a future user decide whether to add an application to his or her computing device.

Such sharing of consumption information can be accomplished by having various devices report their consumption statistics (in an anonymized manner), and compiling such information for provision to other users. As such, a computing device can monitor consumption of the resources that correspond to the device and that are expended at the request of one or more application programs. The computing device can periodically report application programs' consumption of the device's resources to a computer system that aggregates reports on application program resource consumption that are similarly received from other computing devices.

The aggregation system can store information that identifies consumption of computing device resources at the request of each of multiple application programs, and across many different devices on which the various applications have been installed. Such consumption information can be accessed and optionally managed by a system that provides a network-accessible application program software marketplace. The application program software marketplace can present, as accompanying presented representations of application programs that may be downloaded from the application program software marketplace, indicia that illustrate each application program's consumption of computing device resources.

As an alternative to the implementations described in the below description, the present disclosure also includes the following implementations:

Implementation 1 is directed to a computer-implemented method for monitoring application program resource consumption, the method comprises accessing information that identifies consumption, by multiple computing devices and at requests of a particular application program, of resources that correspond to the computing devices, each of the multiple computing devices having provided a portion of the information. The method comprises analyzing, by a computing system, the accessed information to determine one or more values that identify consumption of the resources by at least a subset of the computing devices. The method comprises providing for display, on a particular computing device and in cooperation with a display of a network-accessible application program software marketplace, an indicium that illustrates the one or more values, wherein the application program software marketplace provides application program software for execution by the particular computing device and other computing devices.

Implementation 2 is directed to the method of implementation 1, wherein the resources include data usage of one or more wireless networks by the computing devices.

Implementation 3 is directed to the method of implementation 2, wherein one or more service providers of the wireless networks (i) meter the data usage by the computing devices of the wireless networks, and (ii) bill users of the computing devices based on amounts of data consumed by the users.

Implementation 4 is directed to the method of any one of implementations 1 through 3, wherein the resources include CPU usage or battery usage by the computing devices.

Implementation 5 is directed to the method of any one of implementations 1 through 4, further comprising receiving the information from the multiple computing devices, each of the multiple computing devices having provided a portion of the information such that the portion of the information identified consumption, by that individual computing device, of resources at requests of the particular application program.

Implementation 6 is directed to the method of implementation 5, wherein an operating system installed for individual computing devices of the multiple computing devices monitored monitors consumption by corresponding individual computing devices of resources at requests of the particular application program.

Implementation 7 is directed to the method of implementation 5, wherein the particular application program that is installed individual computing devices of the multiple computing devices monitors consumption by corresponding individual computing devices of resources at requests of the particular application.

Implementation 8 is directed to the method of any one of implementations 1 through 7, wherein the application program is installed at and executing, at least in part, from each of the computing devices.

Implementation 9 is directed to the method of any one of implementations 1 through 8, wherein the particular application program was installed at each of the computing devices in response to each of the computing devices requesting the particular application program from the network-accessible application program software marketplace.

Implementation 10 is directed to the method of any one of implementations 1 through 9, wherein the application program software marketplace provides for users of the computing devices to purchase application programs and provides for at least a monetary portion of the purchases to be provided to developers of the application programs.

Implementation 11 is directed to the method of any one of implementations 1 through 10, further comprising determining the at least subset of the computing devices as being a subset of the computing devices that are operated by users of a social network that have a relationship to a user of the particular computing device, wherein the determination of the one or more values weights more heavily or exclusively the information that identifies the consumption of the resources by the subset of computing devices than information that identifies the consumption of the resources by other of the computing devices that are not in the subset.

Implementation 12 is directed to the method of any one of implementations 1 through 11, further comprising determining the at least subset of the computing devices as being a subset of the computing devices that consume a level of the resources that matches a level of the resources consumed by the particular computing device, wherein the determination of the one or more values weights more heavily or exclusively the information that identifies the consumption of the resources by the subset of computing devices than information that identifies the consumption of the resources by other of the computing devices that are not in the subset.

Implementation 13 is directed to the method of any one of implementations 1 through 12, further comprising determining the at least subset of the computing devices as being a subset of the computing devices that are geographically near to the particular computing device, wherein the determination of the one or more values weights more heavily or exclusively the information that identifies the consumption of the resources by the subset of computing devices than information that identifies the consumption of the resources by other of the computing devices that are not in the subset.

Implementation 14 is directed to the method of any one of implementations 1 through 13, further comprising determining the at least subset of the computing devices as being a subset of the computing devices that use a same wireless network data plan, wherein the determination of the one or more values weights more heavily or exclusively the information that identifies the consumption of the resources by the subset of computing devices than information that identifies the consumption of the resources by other of the computing devices that are not in the subset.

Implementation 15 is directed to the method of any one of implementations 1 through 14, further comprising: identifying another application program that has been determined to be similar to the particular application program; identifying consumption, by the multiple computing devices or another group of computing devices, of resources at requests of the other application program; and using the identified consumption of resources at requests of the other application program in the determination of the one or more values that identify consumption of the resources at requests of the particular application program.

Implementation 16 is directed to the method of implementation 15, wherein the other application program was determined to be similar to the particular application program based on the particular application program and the other application program being assigned in the application program software marketplace to a same category of application program software by different developers of the particular application program and the other application program.

Implementation 17 is directed to the method of implementation 15, wherein the other application program was determined to be similar to the particular application program based on any one or more of the group consisting of: (i) the particular application program and the other application program being determined to use a same operating system application program interface, and (ii) the particular application program and the other application program being determined to request a same permission of an operating system.

Other implementations include one or more computer-readable storage devices storing instructions that, when executed by one or more processing devices, perform operations according to the above-described methods. Other implementations include systems and apparatus that include the described computer-readable storage devices and that are configured to execute the operations using one or more processing devices.

Implementation 18 is directed to one or more computer-readable storage devices storing instructions that, when executed by the one or more processing devices, perform operations comprising: recording, by a computing device, information that identifies consumption of resources corresponding to the computing device at request of a particular application program; and providing, by the computing device and to a computing system that monitors consumption of resources corresponding to the computing device and other computing devices at request of the particular application program, the information that identifies consumption of the resources so as to cause the computing system to (i) aggregate the information with information that identifies consumption of resources corresponding to the other computing devices and (ii) provide a representation of the aggregated information to a system that offers a network-accessible application program software marketplace that uses the provided representation to display, to computing devices that are able to download application programs from the application program software marketplace, an indicium that identifies a level of consumption by the application program.

Implementation 19 is directed to a computer system, comprising: an aggregating computing subsystem to receive, from multiple computing devices, information that identifies consumption of resources corresponding to the multiple computing devices at requests of instances of a same application program that execute by the multiple computing devices; and a marketplace displayer computing subsystem to receive one or more values from the aggregating computing subsystem that represent the consumption of resources corresponding to the multiple computing devices at the requests of the instances of the same application program, and to provide for display, to requesting computing devices that request a display of the same application program by an application program software marketplace, an indicium that represents the one or more values and that provides to users of the requesting computing devices an indication of consumption of computing device resources at requests of the same application program.

Implementation 20 is directed to the computer system of claim 19, wherein the aggregating computing subsystem comprises a personalization computing subsystem to generate the one or more values from the received information, the one or more values representing a consumption of resources at requests of one or more instances of the same application program with respect to consumption of resources at requests of one or more instances of another application programs that have been determined to match the same application program.

Implementation 21 is directed to a computer-implemented method for providing an application program software marketplace, comprising: receiving, by a computing system, a request to provide for display on a remote computing device a representation of at least one of multiple application programs that are available at an application program software marketplace, wherein the application program software marketplace provides for an ability of remote computing devices to download information to execute each of the multiple application programs; identifying, by the computing system, a value that represents a level of consumption, at requests of the one application program, of resources on remote computing devices on which the application program has executed, each of the remote computing devices having provided a portion of information that was used to generate the value; and providing for concurrent display on the remote computing device of (i) the representation of the one application program, and (ii) an indicium that represents the value.

Particular implementations can, in certain instances, realize one or more of the following advantages. Users may be shown more information about the applications they intend to use so that they may select to use application programs that most-efficiently consume the resources of their computing devices. As such, the users' devices may operate more quickly, may operate for a longer duration of time between energy charges, and may consume a reduced amount of costly services (e.g., a data plan or text messages). Furthermore, users may be able to determine a total cost of ownership for application programs. For example, two application programs may appear similar in initial purchase price, but one application program may consume more resources than the other application program. As such, a user may be able to determine that this one application program may actually reflect a greater total cost of ownership than the other application program. Moreover, the public presentation of application program resource consumption may incentivize application program developers to develop application programs that more efficiently consume computing device resources.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
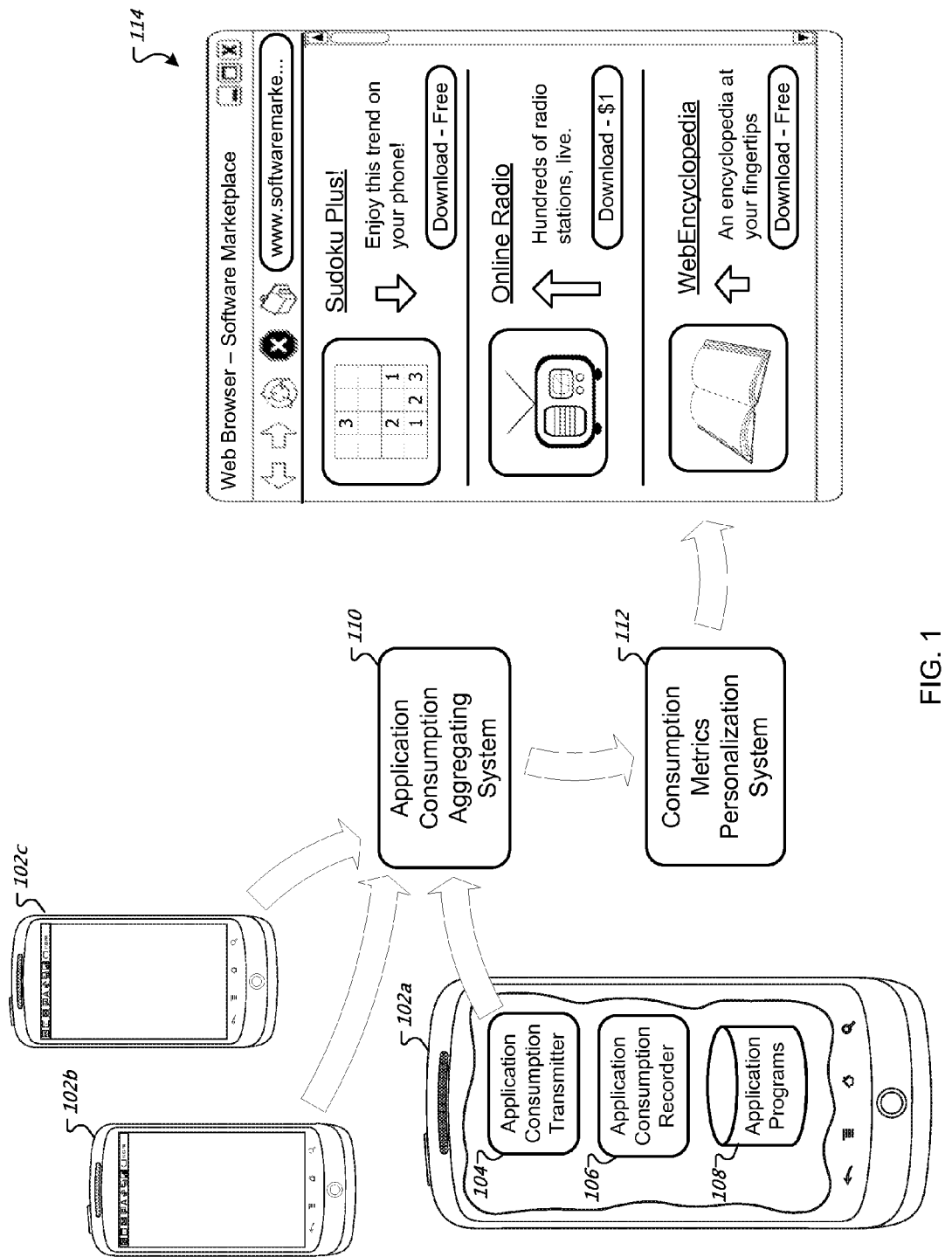
FIG. 1 illustrates a system that monitors application program resource consumption and presents indications of such consumption to users.

This document generally describes techniques for monitoring application program resource consumption and presenting indications of such consumption to users. For example, a system can monitor a level of consumption of computing device resources by an application program on the devices of a group of users. The system can provide an indication of such consumption in a network-accessible application program software marketplace to other users, such as users who might want to acquire application programs.

More specifically, a network-accessible application program software marketplace can help users identify application programs for installation and/or execution by their computing systems. For example, a user can browse a list of the most commonly downloaded application programs over the last month, or can search for application programs that match a user-entered keyword. The software marketplace can provide a payment system that allows the user to purchase application programs that are not free, and can provide at least a portion of the purchase price to developers of the application programs. The software marketplace may offer information about each of the application programs, for example, screenshots, a description, price, and memory required to install the application program.

The software marketplace may also provide information that identifies resource consumption by application programs on computing devices that have installed the application programs—where the resource consumption can vary from device to device and user to user in actual use, depending on how the application is used (i.e., it is not a set amount of consumption, such as storage space, that can be easily determined for the application before installation). For example, the software marketplace may display, next to a title of an application program, an indicium (e.g., a number or an icon) that identifies average wireless network data consumption per month by users that have downloaded the application program. Since some wireless network providers do not offer unlimited wireless network data consumption, or throttle bandwidth speeds after consumption reaches a specified level of wireless network data, such information can help users make informed choices about which application programs to download and use.

The one or more indicia presented for a particular application program may depend on information that identifies the use of resources on multiple computing devices at the request of the application program. The information may be obtained by systems (e.g., on individual client computing devices) that monitor such use of computing system resources. For example, users may download a particular application program to their respective computing devices. The individually-installed instances of the application program, or the operating system on the computing devices, may monitor the requests by the application program and the computing device resources that are consumed in response to the requests. The computing devices can report such consumption information to a centralized system that aggregates information from multiple devices for multiple application programs, and provides information to the software marketplace so as to influence display of different indicia that illustrate application program resource consumption.

FIG. 1 illustrates a system that monitors application program resource consumption and presents indications of such consumption to users. In this illustration, multiple computing devices 102*a-c* monitor consumption of computing device resources that occurs at the request of the application program. The computing devices then send information that identifies the consumption of resources to the application consumption aggregating system 110. The application consumption aggregating system 110 may provide such information to the consumption metrics personalization system 112. The consumption metrics personalization system 112 can tailor the information, for example, to indicate consumption of computing device resources at the request of an application program among a particular subset of the computing devices. The consumption metrics personalization system 112 may provide the personalized information to the application program software marketplace (illustrated by web page 114).

In greater detail, the computing device 102*a* (also referred to herein, in some instances, as a computing system), includes multiple application programs 108. The application programs 108 can represent multiple different computer programs, some of which may have been pre-loaded onto the computing device, and some of which may have been downloaded to the computing device 102*a* through the use of the application program software marketplace.

The computing device 102*a* may execute an application program upon start-up of the computing device 102*a* or upon a user of the computing device 102*a* selecting a graphical interface element that causes execution of the application program. An application program may execute, in some instances, in a foreground display of the computing device. An application program that is executing in the foreground display of the computing device may control at least a portion of the display so as to receive user input within that portion of the display. An application program may also execute in the background of the computing device. With such a background executing application program, the computing device may not display an indication that the application program is presently executing.

The computing device 102*a* can include an application consumption recorder 106. The application consumption recorder 106 can monitor requests by various application programs and the corresponding consumption of computing device resources that occur as a consequence of the requests. For example, the application consumption recorder 106 may periodically identify and record a current level of CPU cycles or volatile memory that is allocated to the application program.

The application consumption recorder 106 may also, or alternatively, periodically identify and record an amount of wireless network data consumption or text messages that have occurred at the request of the application program. Such identified and recorded information may be time stamped and stored with an indication of a status of the application program at that particular time (e.g., background or foreground operation), so that the information can be used to determine resource consumption over specific periods of time or with respect to particular states of the computing devices.

Figure 2:
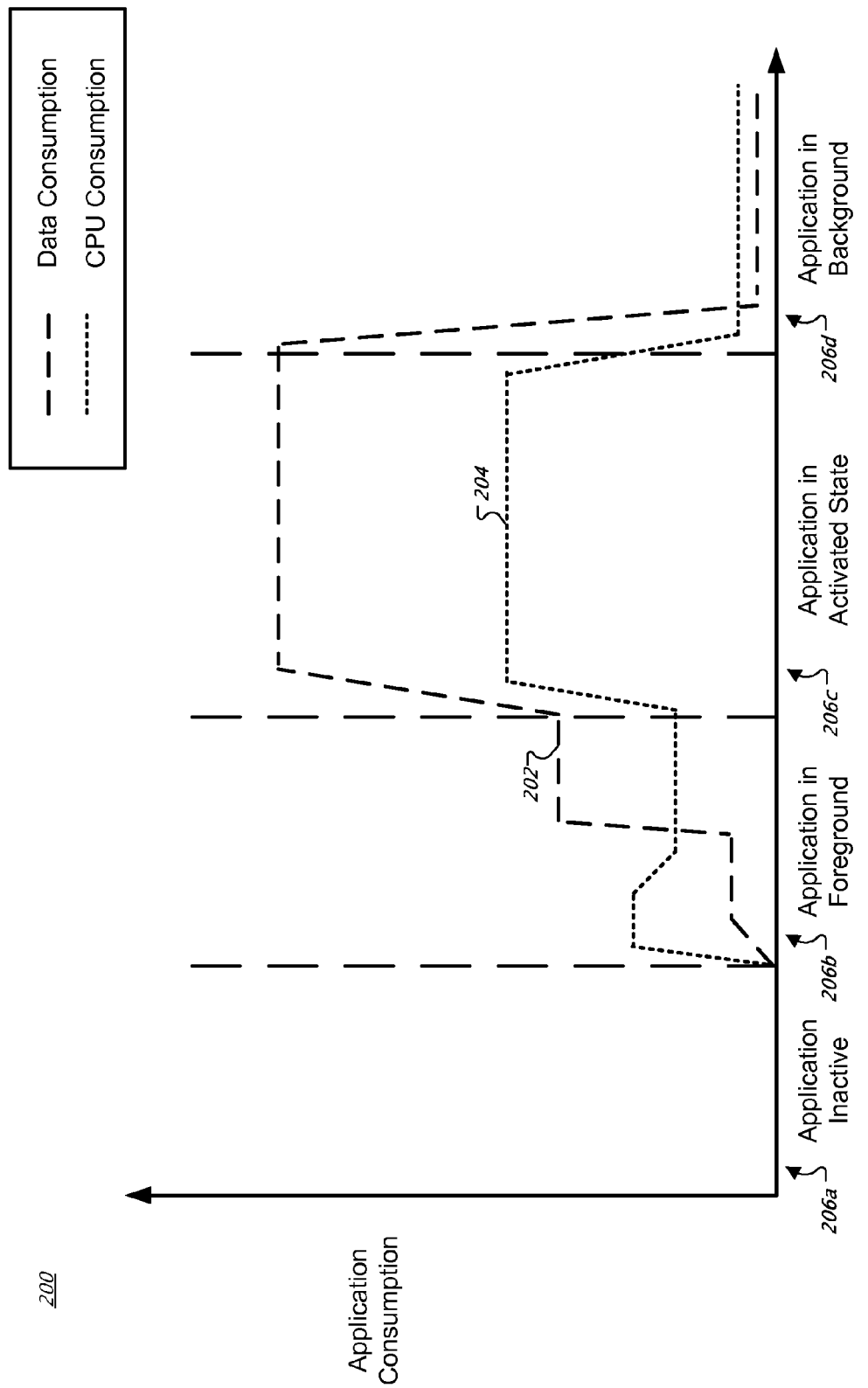
FIG. 2 is a graph that illustrates application consumption of computing device resources with respect to time.

FIG. 2 is a graph 200 that illustrates application consumption of computing device resources with respect to time. In particular, the graph illustrates consumption of resources corresponding to a computing device (i.e., data consumption 202 and CPU consumption 204) at the request of an application program.

During a first time period 206*a*, the application program is inactive. For example, the computing device that hosts the application program may be turned off, or may be turned on but the user may not have provided user input for launching the application program. Accordingly, the system records no data consumption 202 or CPU consumption 204 at the request of the application program for the time period 206*a*.

During a second time period 206*b*, the application program has been launched and is executing in the foreground. For example, the application program may have automatically launched as a consequence of the user turning the computing device on, or the user may have touched his finger to an icon that is displayed by the computing device and that, when selected, causes the computing device to execute the application program. As illustrated by graph 200, the CPU consumption 204 initially jumps upon the application being executed in the foreground and then settles lower for the duration of the time that the application is executing in the foreground. The data consumption 202, on the other hand, slowly increases before substantially increasing near the end of the time period 206*b*.

During a third time period 206*c*, the application program changes execution to an activated state. Both the CPU consumption 204 and the data consumption 202 increase during this activated state. As an illustration, the application program may be a music streaming program. Foreground execution of the application program may involve the user browsing stations that are available for the user to listen. The activated state, however, may occur after a user has elected to listen to a particular music station and is receiving data transmissions of the music over a network.

During a fourth time period 206*d*, the application program changes execution to a background state. For example, a telephone call may have been received by the computing device (a mobile device that includes a telephone in this illustration). A telephone application program may replace the music streaming service as being a foreground application program, and the music may stop streaming from the music streaming service. The computing device may still maintain the music streaming program at a reduced level of execution, so that the music streaming program can automatically resume the foreground state upon termination of the telephone call, or can resume foreground execution quickly upon user request.

In some examples, the application consumption recorder 106 may record application consumption data according to a schedule, for example, periodically every five seconds. The application consumption recorder 106, however, may be prompted to record application consumption data out of schedule upon the application program transitioning to a different state. As such, the application consumption recorder 106 may record application consumption at the beginning of a state and at the end of a state. In some examples, the application consumption recorder 106 may record application data consumption upon the application program raising a particular event, for example, upon the application program sending a text message, requesting an increase in allocated memory, or sending a packet of information over a wireless network. The application consumption recorder 106 may store, with each data point in the consumption data, a corresponding state of the application program and time.

In some implementations, the application consumption recorder 106 may execute, at least in part, from a server system that is remote from the computing device 102a. For example, the computing device 102a may install a particular application program that is a web application program by adding a bookmark to the web application program to a desktop display of the computing device 102a. As such, the web application program may execute at both the server system and at the computing device in a client-server relationship. In such examples, the server system may include the application consumption recorder 106 so as to record consumption of resources of multiple mobile computing devices in a centralized manner. For example, the server system may record a quantity of data that is transmitted to the server system by a particular computing device so as to estimate consumption of a wireless data plan (or a wired data plan) by that particular computing device.

Returning to the description of FIG. 1, the application consumption recorder 106 provides the recorded information to the application consumption transmitter 104. The application consumption transmitter 104 periodically transmits the application consumption data that was recorded by the application consumption recorder 106 to the application consumption aggregating system 110. The application consumption transmitter 104 may transmit the data as it is recorded by the consumption recorder 106 and without bundling with other consumption data, or may bundle the information and send the bundled information to the aggregating system 110 periodically (e.g., every N minutes or days, or upon occurrence of particular events such as the device turning on or the user visiting the software marketplace).

The application consumption transmitter 104 may anonymize the transmitted data. In some examples, the anonymized and transmitted data may be associated with non-personally identifiable user information (e.g., general geography of the device, a service provider that offers wireless network data service to the device, and other similar user and device characteristics, as described in greater detail below). Users may opt out of computing device recording of application consumption and computing device transmission of application consumption data.

The application consumption aggregating system 110 may be executed by a server system that can be physically remote from each of the devices 102a-c. The aggregating system 110 can receive the consumption data from each of the devices 102a-c, and can store consumption data for each particular application program.

The aggregating system 110 may transmit the aggregated data for at least one application program to the application program software marketplace, or may transmit the data to a consumption metrics personalization system 112, which may be a subsystem of the aggregating system 110. The operation of the consumption metrics personalization system 112 is described in greater detail with respect to FIG. 3.

Figure 3:
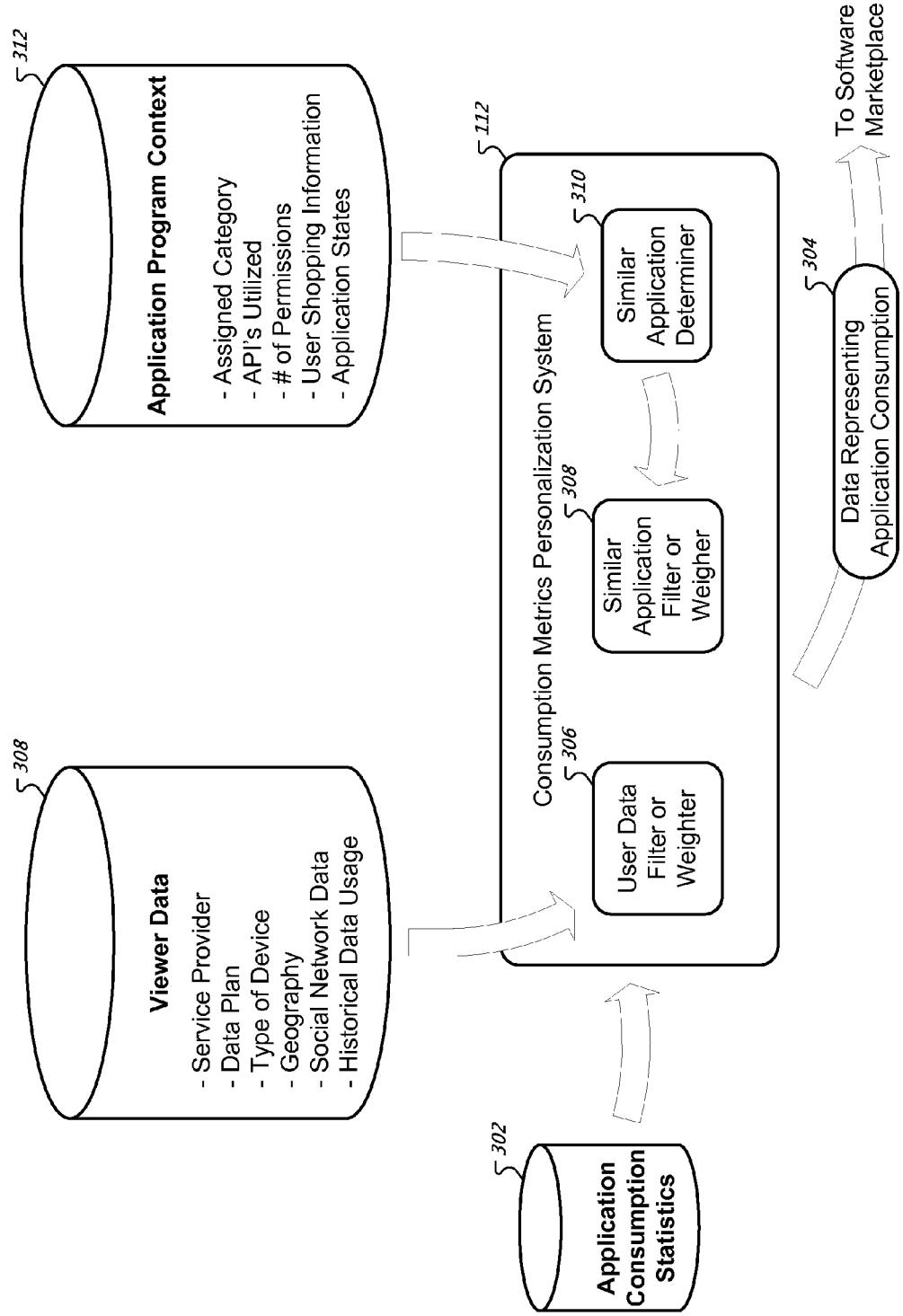
FIG. 3 illustrates operation of a consumption metrics personalization system.

FIG. 3 illustrates operation of a consumption metrics personalization system 112. The personalization system 112 receives application statistics 302 and can analyze the statistics 302 so as to generate different data representing application consumption 304. The different data 304 may be used by a software marketplace to select for display one or more indicia that represent application consumption. The indicia may be personalized for a particular viewer of the software marketplace or normalized with respect to consumption by a particular category of application programs.

The personalization system 112 may use a user data filter or weighter 306 to personalize the application consumption statistics 302 based on viewer data 308. For example, the user data filter or weighter 306 may identify a wireless network data service provider for a viewer of the software marketplace so as to exclude, or weight less heavily, consumption data that was generated by mobile devices that do not use the same wireless network data service provider. In effect, consumption by mobile devices that operate with the same service provider as the software marketplace viewer may be emphasized. Users of the same service provider may be more likely to use their devices similarly than users that do not use the same service provider. As such, consumption data by such similar users may be more valuable in estimating a software marketplace viewer's application consumption than consumption data by other users.

Similarly, the personalization system 112 may identify a wireless network data plan or a computing device of the software marketplace viewer. As such, application statistics 302 that were generated by devices using the same wireless network data plan or the same computing device (e.g., any combination of one or more of make, model, and operating system) may be weighted more heavily by the user data filter or weighter 206 in personalization of application statistics 302.

Under a similar rationale, data that identifies a user's relationships in a social network may be used to filter or weight application consumption statistics 302. For example, a user may be related to two-hundred "friends" in a social network by way of providing input to initiate or accept social network relationships with these two hundred friends. Application consumption statistics 302 that represent consumption by devices that are operated by the user's friends may be weighted with greater emphasis than statistics by devices that are not operated by the user's friends.

A system that accesses a user's social network relationship data to tailor application program statistics for display to the user may prompt the user to "opt-in" to sharing of the social network relationship data. Accordingly, a user that prefers to not share their social network relationship data with the system may see application program statistics that represent resource consumption by the entire community of devices, or may view statistics that are tailored for display to the user based on non-personally identifiable data (e.g., a device of the user).

Moreover, the consumption metrics personalization system 112 can identify users of computing devices that have historically used similar amounts of data (e.g., on a monthly basis). The more similar the historical data consumption of the software marketplace viewer is to historical data consumption of particular devices, the greater weight that the user data filter or weighter 306 provides to consumption statistics 302 that represent consumption by the particular devices.

Weighting of application statistics can include applying a greater coefficient to data that is emphasized (e.g., a value of 0.9 for devices with the same service provider, within the same city, and in which the users are related in a social network) than deemphasized data (e.g., a value of 0.1 for devices that do not have the same service provider, are in different countries, and are not related in a social network).

As an alternative, or in addition, to personalization based on viewer data 308, application consumption statistics 302 can be filtered or weighted by a similar application filter or weighter 308. The similar application filter or weighter 308 can receive from the similar application determiner 310 an indication of an application program on which the viewer of the software marketplace has requested information, and a list of one or more similar application programs. The similar application filter or weighter 308 can filter out consumption data for application programs that have not been determined to be similar to the requested application program, so as to compare application statistics 302 for the requested application program to the similar application programs. The comparison can produce the data 304, which may be, for example, a score of the consumption of the requested application with respect to other similar applications.

The similar application determiner 310 may determine the application programs that are similar to the application program on which the software marketplace viewer has requested information. In some examples, developers of application programs identify one or more categories of the application programs that the developers add to the software marketplace. The similar application determiner 310 may determine that multiple application programs are similar if the multiple applications have been assigned to a same category.

In another example, the similar application determiner 310 identifies that application programs are similar based on the application programs using the same Application Programming Interfaces, requesting the same operating system permissions, operating in the same application state (e.g., background or foreground), or any combination of one or more of the above.

For example, the similar application determiner 310 may deterministically identify two application programs as being related with a 0.8 similarity value based on the application programs accessing a majority of the same APIs and requesting the same operating system permissions. For example, the APIs used by both devices may grant the application programs access to the computing devices' contact book and telephone dialing executable programs, as both application programs may be Voice Over Internet Protocol telephone application programs. The similarity value may be used in the weighting of application consumption statistics 302 by the similar application filter or weighter 308.

As described above, the consumption metrics personalization system 112 can forward the results of the filtering or weighting to the software marketplace as the data representing application consumption 304. The data 304 may be provided to a system that operates the software marketplace, so as to be used to generate, for display to viewers of the software marketplace, indicia that represents application consumption.

Figure 4:
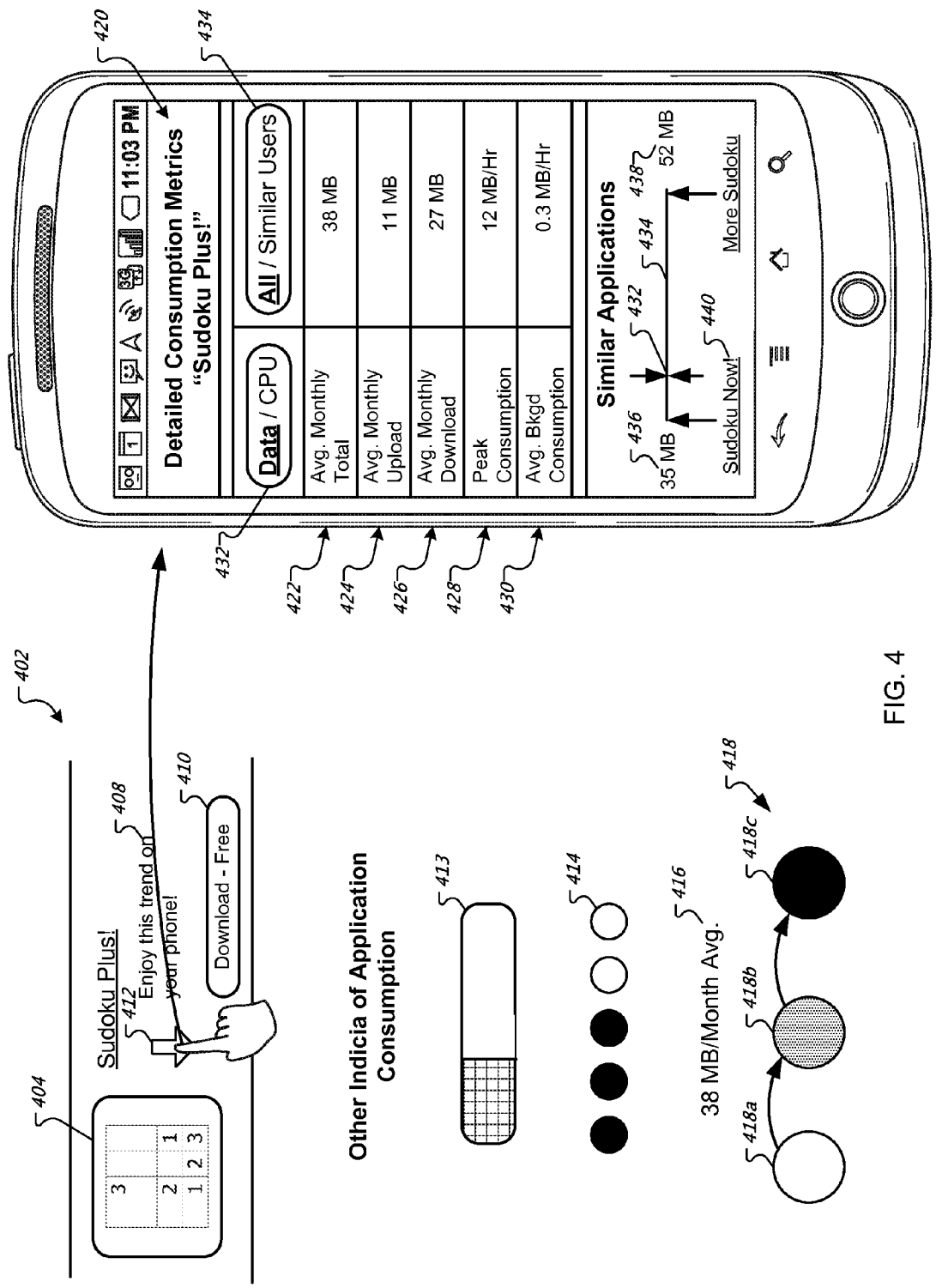
FIG. 4 illustrates indicia that represent application resource consumption for display by a software marketplace.

FIG. 4 illustrates indicia that represent application resource consumption for display by a software marketplace. For example, the application program overview 402 can be a portion of a web page that is presented by a software marketplace, and that provides information about the application program "Sudoku Plus!". The application program overview 402 can include an application program icon 404, an application program title 406, an application program description 408, and a button 410 that a user may select in order to download the "Sudoku Plus!" application program.

The application overview 402 also includes indicium 412 of application resource consumption. In this example, the indicium 412 is a downward facing arrow, which can represent that the "Sudoku Plus!" application program consumes a relatively small amount of wireless network data (or, alternatively, consumes less wireless network data than similar application programs). The downward facing arrow indicium 412 is displayed concurrently with at least a portion of the application overview 402.

Various other indicia may be presented in the application overview 402 in place of, or in addition to, the indicium 412. For example, indicium 413 is a bar that represents a percentage of resource consumption. In this illustration, the bar is less than half-way filled, illustrating that that application program uses a relatively small amount of resources, or less resources than similar application programs. Indicium 414 is a series of graphical interface elements. In this illustration, three of the five graphical interface elements are filled, illustrating that the application program consumes about an average amount of resources. Circular graphical interface elements are shown, but stars or other graphical interface element shapes are can be displayed.

Indicium 416 is a number that illustrates an average quantity of network data consumed by the application program. Indicium 418 is a single graphical interface element that can appear in different colors or shadings depending on the determined consumption of resources at the request of the application program. For example, indicium 418 may appear unshaded 418a if the application program consumes a minimal level of resources, partially shaded 418b if the application program consumes a moderate level of resources, and fully shaded 418c if the application program consumes a large level of resources.

A user may view additional consumption metrics in a detailed consumption metrics display 420 by selecting the indicium 412. The display 420 shows metrics such as average monthly resource data consumption indicium 422, average monthly resource upload consumption indicium 424, average monthly resource download consumption indicium 426, peak hourly consumption indicium 428, and average hourly background data consumption indicium 430. The metrics may be based on a per unit of time basis (e.g., every month, week, day, or hour).

A user may select the button 432 to prompt the computing device to change the resource for which indicia are presented by display 420. Further, the user may select the button 434 to prompt the computing device to change the metrics from statistics that represent all computing devices to statistics that represent computing devices that the system has determined as similar to the viewer of the software marketplace.

The display 420 also includes indicia that illustrate the resource consumption by the "Sudoku Plus!" application program with respect to similar application programs, as determined by the similar application determiner 310. In this example, the double arrow indicium 432 represents data consumption by the "Sudoku Plus!" application program along the bar 434 and with respect to indicia 436 and 438 for the similar application programs "Sudoku Now!" and "More Sudoku." A user may select a link for "Sudoku Now!" 440 to view a display of detailed consumption metrics for that application program.

Figure 5:
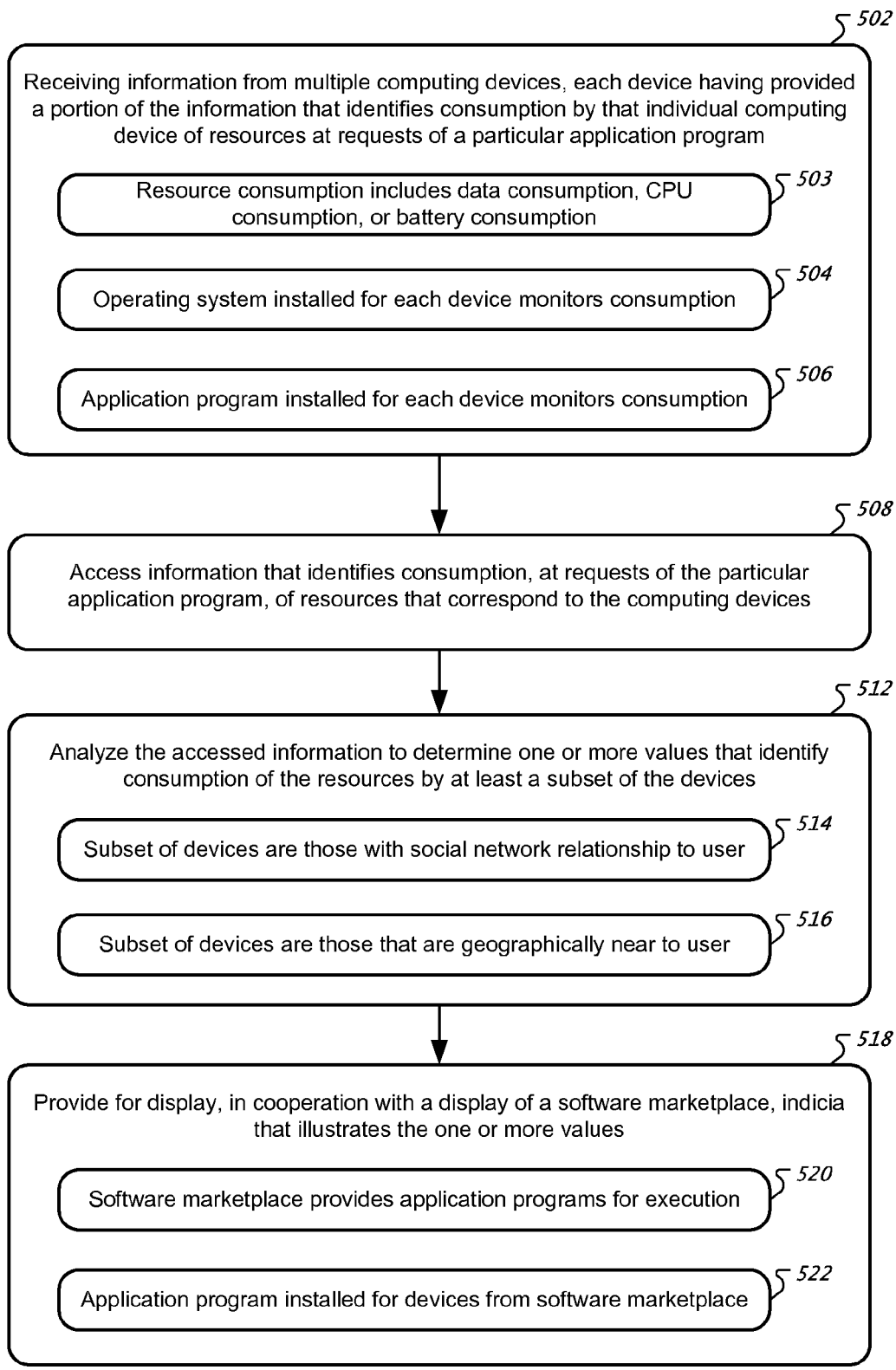
FIG. 5 is a flow chart of a process for monitoring application program resource consumption and presenting indications of such consumption to users.

FIG. 5 is a flow chart of a process for monitoring application program resource consumption and presenting indications of such consumption to users. The process may be performed by the system that is described with respect to FIGS. 1-3 and may provide information for generating the displays of FIGS. 1 and 4.

In box 502, a computing system receives information from multiple computing devices, each of the computing devices having provided a portion of the information. Each portion of the information identifies consumption (also referred to as usage) by that individual computing device of resources at requests of a particular application program. For example, multiple computing devices (e.g., mobile telephones) may monitor the consumption of mobile telephone resources (e.g., wireless data used by the telephone) that are a consequence of requests of the particular application program. Each of these computing devices may report, to the computing system, the consumption of resources at the request of the particular application program (e.g., instances of the application program installed at the computing devices). The computing system may receive the transmissions of information from the computing devices over the Internet.

In box 503, the resource consumption can include any combination of one or more of data consumption, CPU consumption, and battery consumption. For example, the computing system may receive information that identifies the data consumption (e.g., upload and/or download transfers over a wireless network) that has occurred at the request of the particular application program. The resources can also include the CPU consumption (e.g., CPU cycles or a percentage of processing power) and battery consumption (e.g., a level of energy used to run the application program derived from periodic measurements of battery levels in combination with an application program's percentage of CPU consumption). Moreover, the resources may include other resources that correspond to a computing device, for example, text messages sent and received by the computing device and that are associated with a user of the computing device's wireless service plan.

In box 504, the operating system that is installed for each computing device has monitored the consumption of that device's resources performed at the requests of the particular application program. For example, an operating system that was pre-loaded into a computing device at delivery of the computing device to a customer may occasionally identify a level of data transfers that are due to the application program.

In box 506, the application program that is installed by each respective computing device has monitored the consumption of each device's resources at the requests of the particular application program. For example, instances of the application program may be installed on respective computing devices. These instances of the application program may record consumption of resources of the respective computing devices, for example, by storing such statistical information in memory that is reserved for the application program. As an illustration, a Sudoku application program that is installed on a computing device may periodically poll an operating system register to identify a level of CPU cycles or device memory that is allocated to the application program, and may store such information. Furthermore, the Sudoku application program may record the size of external network data transfers that are performed at the request of the Sudoku application program.

In box 508, a computing system accesses information that identifies consumption, at requests of the particular application program, of resources that correspond to the computing devices. For example, the computing system has received the information from the computing devices (as described with respect to box 502), has stored the information, and accesses the information (e.g., to analyze the information as described below).

In box 512, a computing system analyzes the accessed information to determine one or more values that identify consumption of the resources by at least a subset of the devices. In some instances, this analysis includes averaging the consumption values for a particular application program. In some instances, this analysis includes developing a composite score for an application program. The composite score may identify the application program's consumption of multiple different types of resources.

The subset of devices may be a subset of devices that satisfy a determined criterion. This subset of devices may be weighted more heavily or exclusively (e.g., information for the devices that are not in the subset may not be taken into account in the determination) than other devices in a determination of the one or more values. For example, computing devices that use a same wireless network data provider may be determined as being a subset of the computing devices, such that this subset of computing devices may influence the determination of the one or more values exclusively or with greater emphasis than other computing devices that do not satisfy the criterion.

In box 514, the information identifies consumption values for just a subset of the devices, and the subset of the devices are determined to be those devices that have a social network relationship to the device to which consumption indicium is to be shown on the software marketplace. Devices may have a social network relationship if the users of the devices have a relationship to each other in a social network. Users can have a social network relationship if one of the users has requested to view privileged information that is submitted by the other of the users through use of the social network, and the other user has approved the viewing of this privileged information by the requesting user. As such, consumption data by a user's social network "friends" may be weighted more heavily, or exclusively, in determining one or more values that identify consumption of resources by an application program.

In box 516, the information identifies consumption values for just a subset of the devices, and the subset of the devices are those devices that are determined to be geographically near to the user. Devices may be determined to be geographically near to a user based on a distance between the devices as inferred using IP addresses, cellular tower identification numbers, user-specified demographic information, or satellite-based position determining system information (e.g., the Global Positioning System).

As described in greater detail with respect to FIG. 3, the analysis can include various other techniques for analyzing the accessed information. As a single of many examples described throughout this disclosure, the one or more values that identify consumption of resources at request of an application program may be generated based on the statistics of similar application programs. As such, even though a particular application program may use fewer resources than most of the application programs, the one or more values may indicate that the particular application program actually uses more resources than similar application programs.

In box 518, the computing system provides for display, in cooperation with a display of a software marketplace, one or more indicia that illustrate the one or more values. For example, the computing system may transmit the one or more values to a system that operates a software marketplace. The software marketplace system may determine an indicium to display to marketplace viewers based on the one or more values (e.g., a "green circle" for low data consumption, a "yellow circle" for moderate data consumption, or a "red circle" for high data consumption). The software marketplace system may transmit data to a computing device of a viewer of the software marketplace for display of the indicium. In some implementations, the computing system that provides the indicium for display need not display the indicium. Rather the system may provide the indicium for display by transmitting information that is used to generate a display of the indicium.

In box 520, the software marketplace provides application program software for execution by computing devices. For example, the software marketplace may provide a user interface that allows users of computing devices that are remote from the software marketplace system to browse a list of application programs. In some examples, a user may click on a button next to each of the application programs in the list in order to download an installation program for the application program to the user's computing device. In various examples, an installation program for the application program is not provided to the user's computing device, but rather the user's device is directed to communicate with a remote system to execute the application in a client-server relationship.

The software marketplace may require that the user pay for at least some of the application programs. An administrator of the software marketplace may provide a portion of the purchase price to developers of the application programs that provided the application programs to the software marketplace system for dissemination to users of computing devices.

In box 522, the particular application program was installed for each of the computing devices from the software marketplace. For example, the computing devices—for which the accessed information identifies consumption of resources—may all have received the application program, or an installation program for the application program, from the software marketplace. As such, the more devices that download the application program from the software marketplace, the better the statistics that illustrate application consumption.

Figure 6:
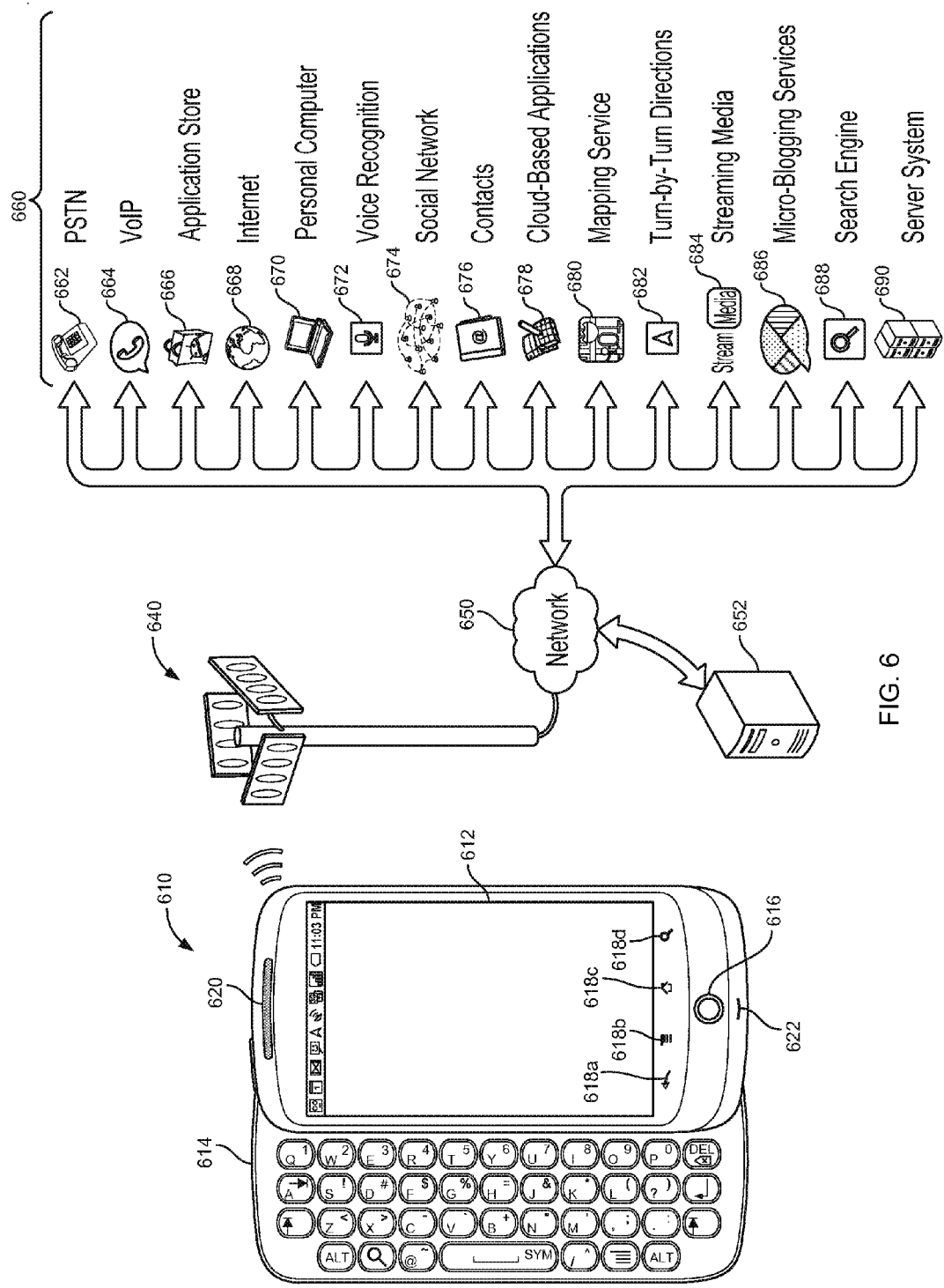
FIG. 6 is a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device wireless access to numerous hosted services 660 through a network 650.

In this illustration, the mobile computing device 610 is depicted as a handheld mobile telephone (e.g., a smartphone, or an application telephone) that includes a touchscreen display device 612 for presenting content to a user of the mobile computing device 610 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 614, physical buttons, trackballs, accelerometers, gyroscopes, and magnetometers).

Example visual output mechanism in the form of display device 612 may take the form of a display with resistive or capacitive touch capabilities. The display device may be for displaying video, graphics, images, and text, and for coordinating user touch input locations with the location of displayed information so that the device 610 can associate user contact at a location of a displayed item with the item. The mobile computing device 610 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*' and '#.' The keyboard 614 receives input when a user physically contacts or depresses a keyboard key. User manipulation of a trackball 616 or interaction with a track pad enables the user to supply directional and rate of movement information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618a-d. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME OS, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" graphical user interface that is displayed after turning on the mobile computing device 610, after activating the mobile computing device 610 from a sleep state, after "unlocking" the mobile computing device 610, or after receiving user-selection of the "home" button 618c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 610 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 610 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 610. The mobile device 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., ETHERNET, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computing systems that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing systems associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call using a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 7:
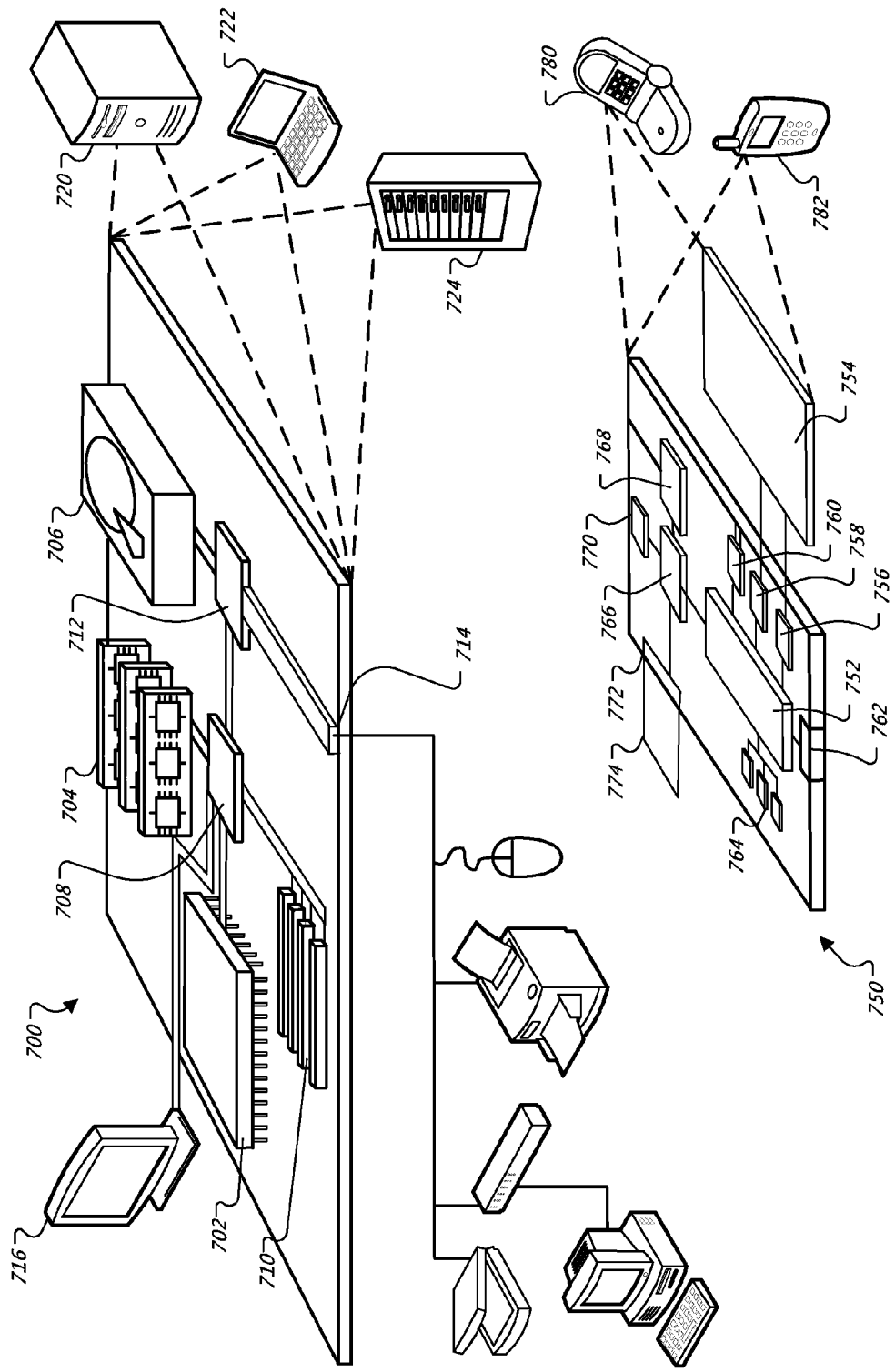
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provided, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
monitoring, by a computing system, performance of a particular application program among multiple computing devices by accessing information that identifies, as a result of requests by the particular application program on the multiple computing devices, a first level of either battery consumption or wireless data transfer by the multiple computing devices;
analyzing, by the computing system, the accessed information to determine one or more values that identify a second level of either battery consumption or wireless data transfer by at least a subset of the multiple computing devices; and
providing, by the computing system and for display by a particular computing device in cooperation with a display of a network-accessible application program software marketplace, an indicium that indicates the one or more values, wherein the application program software marketplace provides application program software for execution by the particular computing device and other computing devices that access the application program software marketplace.

2. The computer-implemented method of claim 1, wherein the second level is a level of either average battery consumption or average wireless data transfer by the at least subset of the multiple computing devices over a defined length of time.

3. The computer-implemented method of claim 2, wherein the defined length of time is a minute, an hour, a day, a week, or a month.

4. The computer-implemented method of claim 1, wherein:
the information identifies the first level of battery consumption by the multiple computing devices as the result of the requests by the particular application program; and
the determined one or more values identify the second level of battery consumption by the at least subset of the multiple computing devices as the result of the requests by the particular application program.

5. The computer-implemented method of claim 1, wherein:
the information identifies the first level of wireless data transfer by the multiple computing devices as the result of the requests by the particular application program; and
the determined one or more values identify the second level of wireless data transfer by the at least subset of the multiple computing devices as the result of the requests by the particular application program.

6. The computer-implemented method of claim 5, wherein:
the first level of wireless data transfer or the second level of wireless data transfer identifies a quantity of data transferred using one or more wireless networks; and
one or more service providers of the one or more wireless networks: (i) meter at least some of the quantity of data transferred using the one or more wireless networks, and (ii) bill at least some users of the multiple computing devices based on the metered at least some of the quantity of data.

7. The computer-implemented method of claim 1, further comprising:
identifying another application program that has been determined to be similar to the particular application program;
identifying, as a result of requests by the another application program on at least some of the multiple computing devices or another group of computing devices, a third level of either battery consumption or wireless data transfer by the at least some of the multiple computing devices or the another group of computing devices; and
using the identified third level of either battery consumption or wireless data transfer in the determination of the one or more values that identify, as the result of the requests by the particular application program, the second level of either battery consumption or wireless data transfer.

8. The computer-implemented method of claim 7, wherein the indicium indicates a comparison of battery consumption or wireless data transfer by the particular application program with respect to battery consumption or wireless data transfer by the another application program.

9. The computer-implemented method of claim 1, wherein the determination of the one or more values weights more heavily (i) information that identifies the first level of either the battery consumption or the wireless data transfer by some of the multiple computing devices, than (ii) information that identifies the first level of battery consumption or wireless data transfer by other of the multiple computing devices that are not the some of the multiple computing devices.

10. The computer-implemented method of claim 9, further comprising identifying the some of the multiple computing devices as some of the multiple computing devices that have a particular commonality with the particular computing device or a user of the particular computing device.

11. The computer-implemented method of claim 1, wherein providing the indicium for display by the particular computing device in cooperation with the display of the network-accessible application program software marketplace comprises displaying the indicium in a web page that is provided by the application program software marketplace.

12. The computer-implemented method of claim 11, wherein the web page presents a display of the indicium next to a title of the particular application program.

13. The computer-implemented method of claim 11, wherein the web page presents a display of the indicium, a title of the particular application program, a description of the particular application program, and a price of the particular application program.

14. The computer-implemented method of claim 1, wherein providing the indicium for display by the particular computing device in cooperation with the display of the network-accessible application program software marketplace comprises the particular computing device presenting a concurrent display of:
(i) information about the particular application program and the indicium; and
(ii) information about another application program and another indicium that indicates one or more values that identify a level of either battery consumption or wireless data transfer by certain computing devices as a result of requests by the another application program on the certain computing devices.

15. The computer-implemented method of claim 1, further comprising receiving the information from the multiple computing devices, each of the multiple computing devices having provided a portion of the information such that the portion of the information provided by a respective individual computing device identifies, as a result of some requests by the respective individual computing device, a level of battery consumption or wireless data transfer by the respective individual computing device.

16. The computer-implemented method of claim 1, wherein the particular application program is installed at and executed, at least in part, from each of the multiple computing devices.

17. The computer-implemented method of claim 1, wherein the particular application program was installed at each of the multiple computing devices in response to each of the multiple computing devices submitting a request that the network-accessible application program software marketplace to provide the particular application program.

18. The computer-implemented method of claim 1, wherein the first level of either battery consumption or wireless data transfer is same as the second level of either battery consumption or wireless data transfer.

19. One or more computer-readable storage devices storing instructions that, when executed by one or more processing devices of a computing device, cause performance of operations that comprise:
recording, by the computing device, information that identifies, as a result of requests by a particular application program on the computing device, a first level of either battery consumption or wireless data transfer by the computing device; and
providing, by the computing device and to a computing system that monitors performance of the particular application program among multiple computing devices, the information that identifies the first level of either battery consumption or wireless data transfer by the computing device, so as to cause the computing system to:

(a) generate one or more values by aggregating the information that was provided by the computing device with other information that was provided by other computing devices of the multiple computing devices and that identifies, as a result of other requests by the particular application program on the other computing devices, a second level of either battery consumption or wireless data transfer by the other computing devices, and (b) provide a representation of the one or more values to a system that displays, in cooperation with a display of a network-accessible application program software marketplace to computing devices that are able to download application programs from the application program software marketplace, an indicium that indicates the one or more values.

\* \* \* \* \*